(12) United States Patent
Hunt et al.

(10) Patent No.: US 9,377,894 B2
(45) Date of Patent: Jun. 28, 2016

(54) SELECTIVE TURNING OFF/DIMMING OF TOUCH SCREEN DISPLAY REGION

(71) Applicant: Sony Corporation, Tokyo (JP)

(72) Inventors: Alexander Hunt, Tygelsjo (SE); Samir Drincic, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/284,613

(22) Filed: May 22, 2014

(65) Prior Publication Data
US 2015/0338984 A1 Nov. 26, 2015

(51) Int. Cl.
*G06F 3/041* (2006.01)
*G06F 1/32* (2006.01)
*G09G 5/10* (2006.01)
*G06F 3/0488* (2013.01)

(52) U.S. Cl.
CPC ............ *G06F 3/0416* (2013.01); *G06F 1/3231* (2013.01); *G06F 1/3262* (2013.01); *G06F 1/3265* (2013.01); *G06F 3/0412* (2013.01); *G06F 3/0488* (2013.01); *G09G 5/10* (2013.01); *G09G 2320/0626* (2013.01); *G09G 2330/027* (2013.01); *G09G 2354/00* (2013.01); *Y02B 60/1242* (2013.01)

(58) Field of Classification Search
CPC ... G06F 3/0416; G06F 3/0412; G06F 1/3231; G06F 1/3262; G06F 1/3265; G06F 3/0488; G09G 5/10
See application file for complete search history.

(56) References Cited

U.S. PATENT DOCUMENTS

| | | |
|---|---|---|
| 2005/0251746 A1 | 11/2005 | Basson et al. |
| 2008/0158144 A1 | 7/2008 | Schobben et al. |
| 2009/0095540 A1* | 4/2009 | Zachut et al. ............... 178/18.03 |
| 2010/0253641 A1 | 10/2010 | Swedin |
| 2012/0013569 A1 | 1/2012 | Swedin |
| 2012/0038571 A1* | 2/2012 | Susani ........................... 345/173 |
| 2013/0335453 A1* | 12/2013 | Lim ....................... G09G 5/373 345/661 |

FOREIGN PATENT DOCUMENTS

| | | |
|---|---|---|
| EP | 2 104 023 A2 | 9/2009 |
| EP | 2214091 A2 | 8/2010 |
| JP | 2011007833 A * | 1/2011 |
| WO | 2012147686 A1 | 11/2012 |
| WO | 2013080444 A1 | 6/2013 |

OTHER PUBLICATIONS

International Search Report and Written Opinion issued for corresponding international application No. PCT/IB2014/065810, mailed Jan. 19, 2015, 10 pages.

* cited by examiner

*Primary Examiner* — Latanya Bibbins
(74) *Attorney, Agent, or Firm* — Tucker Ellis LLP (57) ABSTRACT

A device includes a touch screen display comprising a touch sensitive panel and a display. The touch sensitive panel receives a touch event, and records the touch event as touch panel data. The device analyzes the touch panel data to identify the touch event as a valid or a non-valid touch event, determines, if the touch event is a non-valid touch event and based on the touch panel data, one or more regions of a touch panel display associated with the non-valid touch event, and turns off or dims the determined one or more regions of the touch panel display.

19 Claims, 10 Drawing Sheets

SELECTIVE TURNING OFF/DIMMING OF TOUCH SCREEN DISPLAY REGION

BACKGROUND

Many different types of consumer electronics devices today typically include a touch screen display that may act as an output device that displays image, video and/or graphical information, and which further may act as an input touch interface device for receiving touch control inputs from a user. A touch screen (or touch sensitive panel) may detect the presence and location of a touch within the area of the display, where the touch may include a touching of the display with a body part (e.g., a finger) or with certain objects (e.g., a stylus). Touch screen displays typically enable the user to interact directly with what is being displayed, rather than indirectly with a cursor controlled by a mouse or touchpad. Touch screen displays have become widespread in use with various different types of consumer electronic devices, including, for example, cellular radiotelephones, personal digital assistants (PDAs), and hand-held gaming devices.

SUMMARY

In one exemplary embodiment, a method may include receiving a touch event upon a device's touch screen display, wherein the touch screen display comprises a touch sensitive panel and a display; recording the touch event as touch panel data; analyzing the touch panel data to identify the touch event as a valid or a non-valid touch event; determining, if the touch event is a non-valid touch event and based on the touch panel data, one or more regions of the display associated with the non-valid touch event; and turning off or dimming the determined one or more regions of the display.

Additionally, the method further comprises turning on the one or more regions of the display a threshold length of time subsequent to an end of the touch event.

Additionally, analyzing the touch panel data comprises analyzing the touch panel data to determine a persistence associated with the touch event upon the touch sensitive panel.

Additionally, the touch panel data comprises a two-dimensional or three-dimensional image of the touch event upon the touch sensitive panel and analyzing the touch panel data comprises analyzing a shape of the two-dimensional or three dimensional image of the touch event.

Additionally, determining if the touch event is a non-valid touch event comprises determining a persistence associated with the shape of the two-dimensional or three-dimensional image of the touch event.

Additionally, determining the persistence comprises determining if the persistence associated with the shape of the two-dimensional or three-dimensional image of the touch event is greater than a threshold period of time.

Additionally, analyzing the touch panel data to identify the touch event as a valid touch event comprises analyzing the touch panel data to identify a shape and movement of the touch event on the touch panel.

Additionally, the method, in response to determining that the touch event is a valid touch event, further comprises determining a position of the touch event on the touch sensitive panel and the display; estimating a size of the touch event on the touch sensitive panel and the display; and turning off the display in a first region corresponding to the position of the touch event.

Additionally, the method further comprises turning on the first region of the display a threshold length of time subsequent to an end of the touch event.

Additionally, the method further comprises dimming the display in a second region surrounding the first region.

Additionally, the method further comprises un-dimming the display in the second region a threshold length of time subsequent to an end of the touch event.

In an exemplary embodiment, a device includes a touch screen display comprising a touch sensitive panel and a display and configured to: receive a touch event upon the touch sensitive panel, and record the touch event as touch panel data; and a processing unit configured to: analyze the touch panel data to identify the touch event as a valid or a non-valid touch event, determine, if the touch event is a non-valid touch event and based on the touch panel data, one or more regions of the display associated with the non-valid touch event, and turn off or dim the determined one or more regions of the display.

Additionally, the processing unit is further configured to turn on the one or more regions of the display a threshold length of time subsequent to an end of the touch event.

Additionally, when analyzing the touch panel data, the processing unit is configured to analyze a two-dimensional shape of the touch event based on the touch panel data.

Additionally, when determining if the touch event is a non-valid touch event, the processing unit is configured to determine if a persistence associated with the two-dimensional shape of the touch event, based on the touch panel data, is greater than a threshold period of time.

Additionally, when analyzing the touch panel data to identify the touch event as a valid touch event, the processing unit is configured to analyze the touch panel data to identify a shape and movement of the touch event on the touch sensitive panel.

Additionally, in response to determining that the touch event is a valid touch event, the processing unit is further configured to determine a position of the touch event on the touch sensitive panel and the display, estimate a size of the touch event on the touch sensitive panel and the display, turn off the display in a first region corresponding to the position of the touch event, and dim the display in a second region surrounding the first region.

Additionally, the processing unit is further configured to turn on the first region of the display, and un-dim the display in the second region, a threshold length of time subsequent to an end of the touch event.

In another exemplary embodiment, a non-transitory computer-readable medium containing instructions executable by at least one processing unit, includes one or more instructions for recording a touch event upon a device's touch screen display as touch panel data, wherein the touch screen display comprises a touch sensitive panel and a display; one or more instructions for analyzing the touch panel data to identify the touch event as a valid or a non-valid touch event; one or more instructions for determining, if the touch event is a non-valid touch event and based on the touch panel data, one or more regions of the display associated with the non-valid touch event; and one or more instructions for turning off or dimming the determined one or more regions of the display.

Additionally, in response to determining that the touch event is a valid touch event, the instructions further comprise: one or more instructions for determining a position of the touch event on the touch sensitive panel and the display; one or more instructions for estimating a size of the touch event on the touch sensitive panel and the display; one or more instructions for turning off the display in a first region corresponding to the position of the touch event; and one or more instructions for dimming the display in a second region surrounding the first region.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

In existing electronic devices that incorporate touch screen displays, when a user touches any location on the touch sensitive panel of the touch screen display, the device generates a touch input and reacts instantly to control the operation of the device based on the touch input. The touch screen display of the electronic device may be an emissive type display such as, for example, an organic light-emitting diode (OLED) display, a field emission display (FED), a nano-emissive display (NED) type display, or other types of emissive display technologies. The instant reaction of the touch sensitive panel to the touch input may, however, generate erroneous inputs under certain circumstances. For example, when a user is holding a tablet computer with one or both hands, the hand(s) holding the tablet may extend beyond a bezel edge of the face of the device such that a touch occurs upon the touch sensitive panel, causing an erroneous touch input. To attempt to alleviate this problem, many electronic devices are designed with large bezels around the edge of the touch screen display to provide a larger space for the user's hands to grip without causing non-valid touches upon the touch sensitive panel.

In embodiments described herein, obstructed regions of the display (i.e., beneath the finger or hand) are turned off and/or dimmed in order to save energy. Since the regions turned off and/or dimmed are already obstructed by the touching finger(s) or hand(s), and are not visible to the user due to the obstruction, turning off and/or dimming those region(s) does not negatively impact the user's experience using the touch screen display. In some embodiments, touch panel data that includes a two-dimensional or three-dimensional image of a touch event received upon the touch screen display may be recorded, and then analyzed to determine whether the touch event upon the touch sensitive panel of the display is a valid touch event associated with normal operation of the device, or is a non-valid touch event. A region(s) associated with the touch event (e.g., under the finger or hand) on the touch screen display may be identified, and the region(s) of the display may be turned off and/or dimmed to save energy and conserve the battery life of the electronic device. Additionally, turning off and/or dimming obstructed regions of the device display enables smaller bezels to be used around the perimeter of the touch screen display.

Overview

Figure 1:
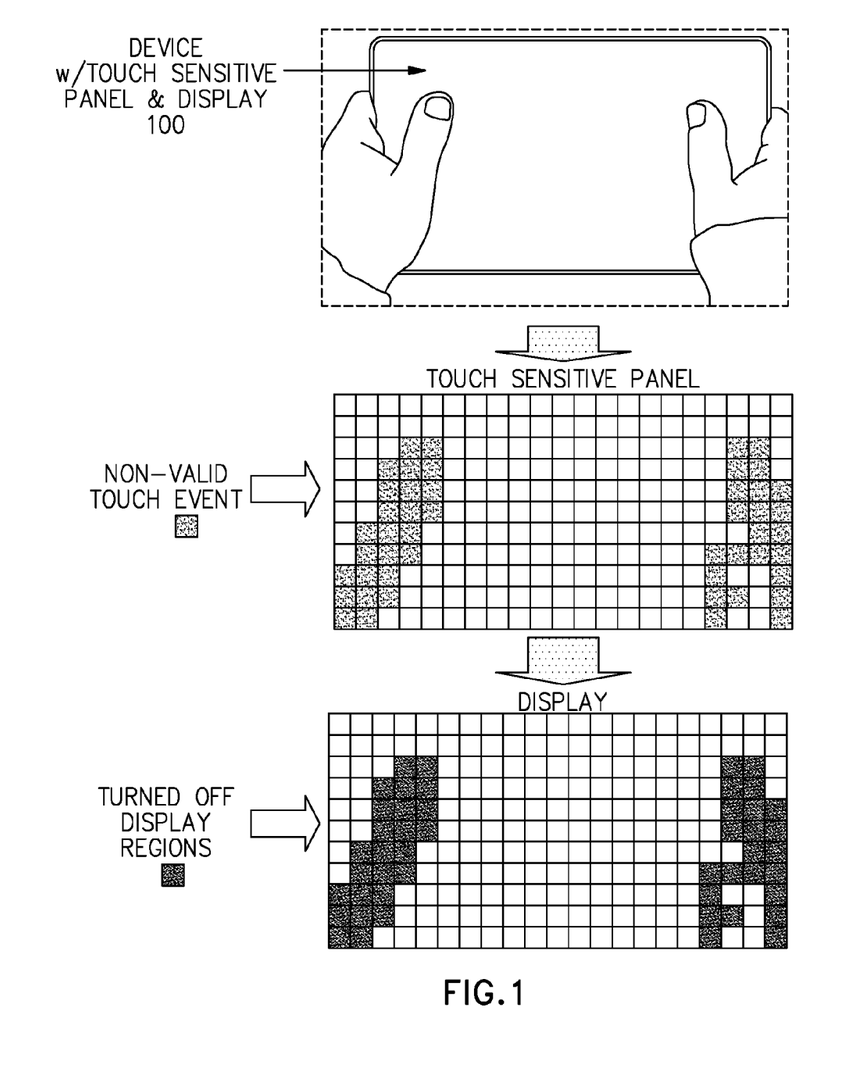
FIG. 1 illustrates an overview of the selective turning off of one or more regions of a touch screen display of a device having a touch panel and a display based on a touch event upon the touch screen display.

FIG. 1 illustrates an overview of the selective turning off of one or more regions of a touch screen display of a device 100 based on a touch event upon the touch screen display. Device 100 may include any type of electronic device having a touch screen display that includes a touch sensitive panel and an associated display. Device 100 may include, for example, a cellular telephone (e.g., a smart phone), a tablet computer, a media player, a satellite navigation device, a gaming device, a digital camera, a personal digital assistant (PDA), etc. In some embodiments, device 100 may include a portable, handheld electronic device.

As shown in FIG. 1, a user of device 100 may initiate a touch event upon the touch screen display of device 100. For example, as shown at the top of FIG. 1, the user may grip each side of device 100 with the user's thumbs and portions of the user's palms touching the touch screen display of device 100. Device 100 may, as further described below, detect the user's thumbs and palms holding device 100, and touching the touch sensitive panel as a touch event. Device 100 may record the touch event as touch panel data, which may include a two-dimensional or three-dimensional image of the user's thumbs and palms touching the touch panel. Device 100 may analyze the touch panel data to identify the touch event as either a valid touch event or a non-valid touch event. The analysis, described in further detail below, may include, for example, analyzing a shape of the two-dimensional or three-dimensional image of the touch event upon the touch panel. The analysis may further include analyzing the persistence of the touch or shape (e.g., how long the shape lasts) of the two-dimensional or three-dimensional image of the touch event upon the touch panel. Device 100 may, based on the analysis of the touch panel data, identify the touch event as a non-valid touch event, as depicted in the middle of FIG. 1, which shows the touch sensitive panel and an identified non-valid touch event in shaded regions of the touch sensitive panel.

Device 100 may, upon identifying the touch event as a non-valid touch event, turn off one or more regions of the display that correspond to the two dimensional or three-dimensional shape of the touch event, as shown via the darkened regions at the bottom of FIG. 1. "Turning off" one or more regions of the display, as referred to herein, may involve temporarily de-energizing, or removing the supply of power, to the one or more regions of the display of the touch screen display causing those regions to appear dark. Device 100 may maintain the one or more regions of the display in a turned off state for a threshold length of time subsequent to an end of the touch event. For example, once the user removes the touch event from the touch panel (i.e., removes the user's hands), device 100 may count down the threshold length of time, and then turn on the previously turned off region or regions of the display of device 100.

Figure 2:
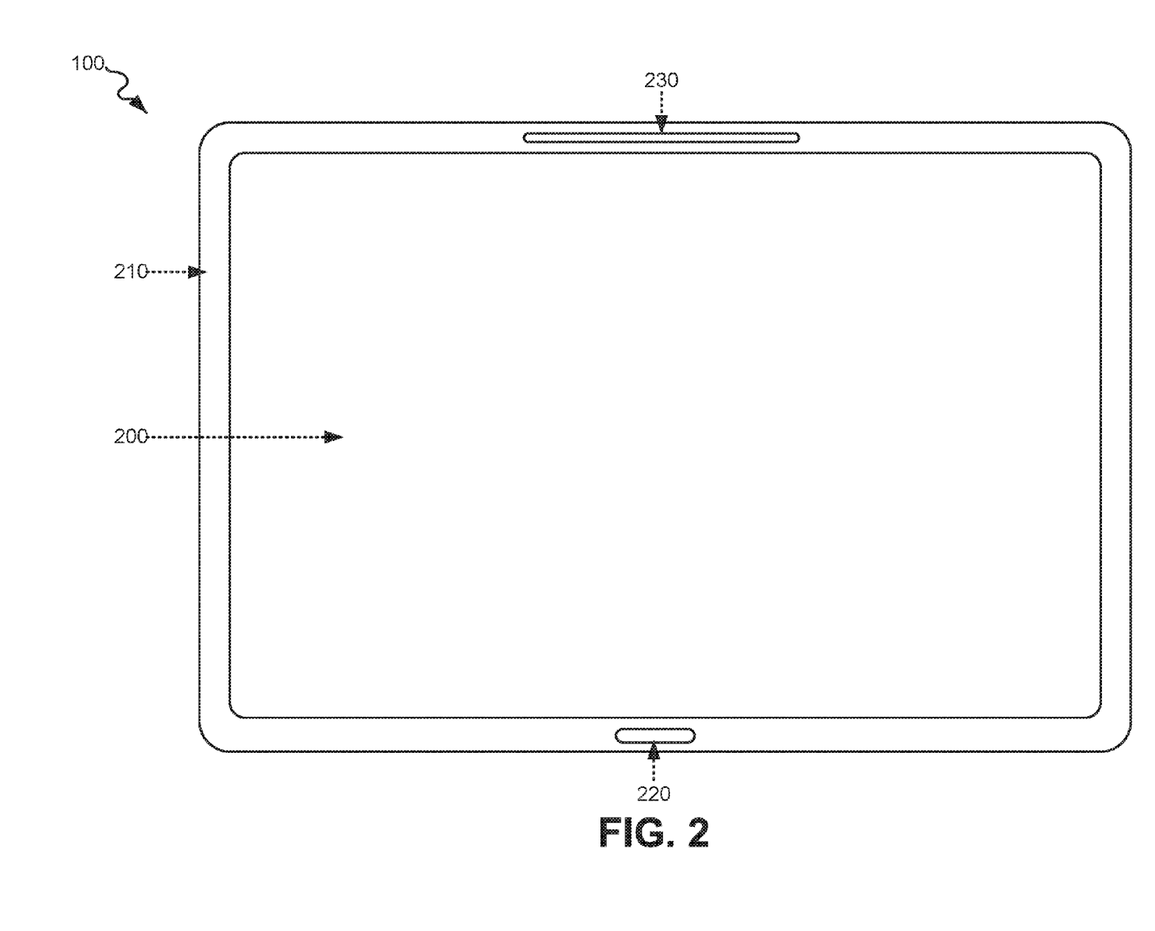
FIG. 2 is a diagram that depicts an exemplary exterior configuration of the device of FIG. 1.

FIG. 2 depicts an exemplary external configuration of device 100. As shown, device 100 has, on or in a front face of device 100, a touch screen display 200 and a bezel 210 that includes a portion of the housing of device 100 that surrounds the edge of touch screen display 200. Device 100 may further include a microphone 220 for receiving audio input, and a speaker 230 for generating audio output. The display component of touch screen display 200 may display text, graphics, images and/or video, and the touch sensitive panel may receive user touch input.

The touch sensitive panel of touch screen display 200 may be integrated with, and/or overlaid on, the display (i.e., the display lying beneath the touch sensitive panel in FIG. 2) to form a touch screen or a panel-enabled display that may function as a user input interface. For example, in one implementation, the touch sensitive panel may include a near field-sensitive (e.g., capacitive), acoustically-sensitive (e.g., surface acoustic wave), photo-sensitive (e.g., infrared), and/or any other type of touch sensitive panel that allows a display to be used as an input device. In another implementation, the touch sensitive panel may include multiple touch-sensitive technologies. Generally, the touch panel component may include any kind of technology that provides the ability to identify the occurrence of a touch event upon touch screen display 200.

The display associated with touch screen display 200 displays signals generated by device 100 as text, graphics, images or video on a screen (e.g., liquid crystal display (LCD), cathode ray tube (CRT) display, organic light-emitting diode (OLED) display, surface-conduction electro-emitter display (SED), plasma display, field emission display (FED), nano-emissive display (NED), bistable display, etc.). In certain implementations, the display may provide a high-resolution, active-matrix presentation suitable for a wide variety of applications and features associated with typical electronic devices. The display may provide visual information to the user and serve—in conjunction with the touch sensitive panel—as a user interface to detect user input.

Figure 3:
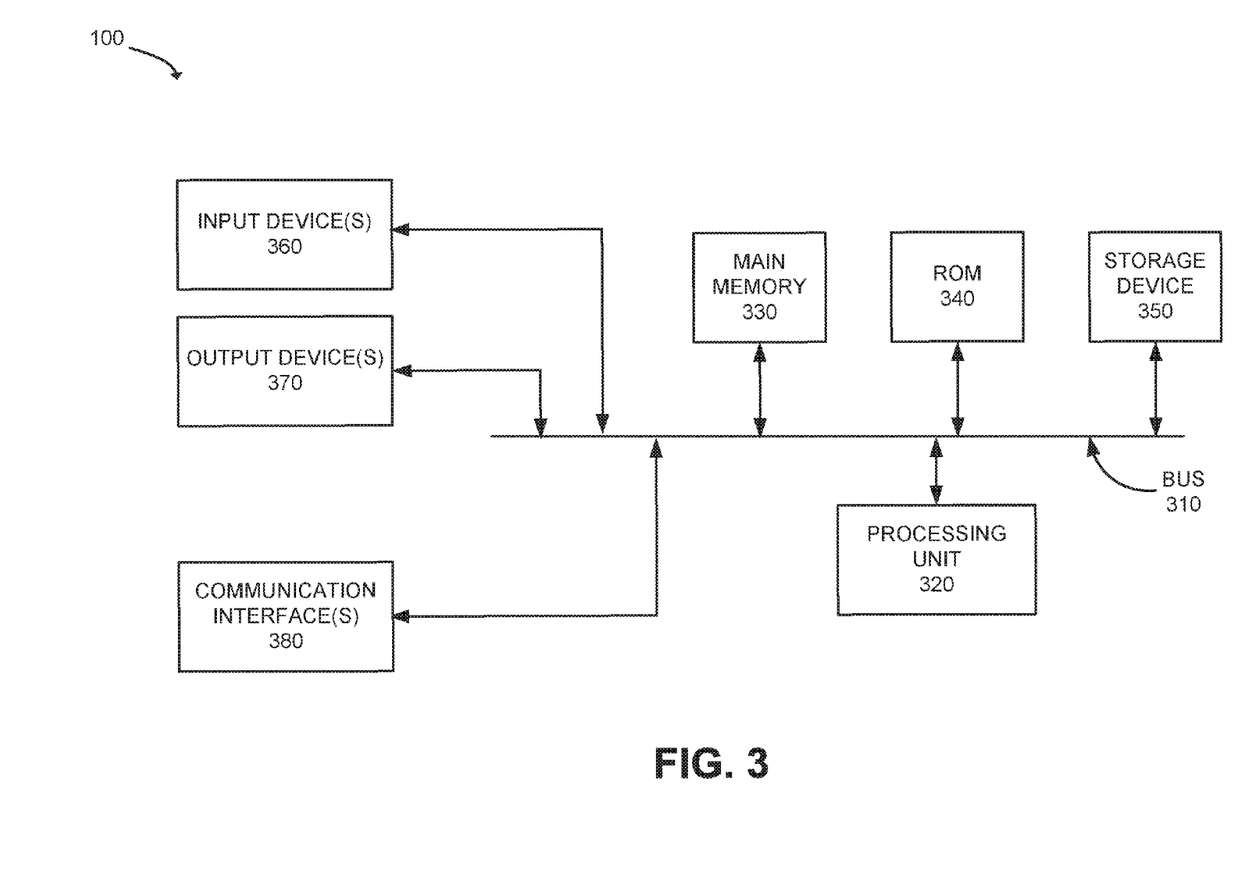
FIG. 3 is a diagram that depicts exemplary components of the device of FIG. 1.

FIG. 3 is a diagram that depicts exemplary internal components of device 100. Device 100 may include a bus 310, a processing unit 320, a main memory 330, a read only memory (ROM) 340, a storage device 350, an input device(s) 360, an output device(s) 370, and a communication interface(s) 380. Bus 310 may include a path that permits communication among the components of device 100.

Processing unit 320 may include one or more processors, microprocessors, or processing logic that may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium and its corresponding drive. Storage device 350 may further include a flash drive. Main memory 330, ROM 340 and storage device 350 may each be referred to herein as a "tangible non-transitory computer-readable medium."

Input device(s) 360 may permit a user to input information to device 100, such as, for example, a keypad or a keyboard, voice recognition and/or biometric mechanisms, etc. Additionally, input device(s) 360 may include the touch sensitive panel of touch screen display 200 that permits touch input by the user. Output device(s) 370 may output information to the user, such as, for example, a display, a speaker, etc. Additionally, output device(s) 370 may include the display of touch screen display 200, where the display outputs information to the user. Communication interface(s) 380 may include one or more communication interfaces that enable device 100 to communicate with other devices and/or systems. Communication interface(s) 380 may communicate with another device or system via a network. For example, communication interface(s) 380 may include a radio transceiver for communicating with a network via wireless radio channels over a first wireless connection. As another example, communication interface(s) 380 may further include a radio transceiver for communicating with other devices via short range wireless protocols (e.g., BlueTooth) over a second wireless connection.

Device 100 may perform certain operations or processes, as described in detail below. Device 100 may perform these operations in response to processing unit 320 executing software instructions contained in a computer-readable medium, such as memory 330. A computer-readable medium may be defined as a physical or logical memory device. A logical memory device may include memory space within a single physical memory device or spread across multiple physical memory devices.

The software instructions may be read into main memory 330 from another computer-readable medium, such as storage device 350, or from another device via communication interface(s) 380. The software instructions contained in main memory 330 may cause processing unit 320 to perform operations or processes that are described below. Alternatively, hardwired circuitry may be used in place of or in combination with software instructions to implement processes consistent with different embodiments of device 100. Thus, exemplary implementations are not limited to any specific combination of hardware circuitry and software.

The configuration of components of device 100 illustrated in FIG. 3 is for illustrative purposes only. It should be understood that other configurations may be implemented. Therefore, device 100 may include additional, fewer, different and/or differently configured components than those depicted in FIG. 3. For example, device 100 may include a power source (e.g., a battery) not depicted in FIG. 3.

Figure 4:
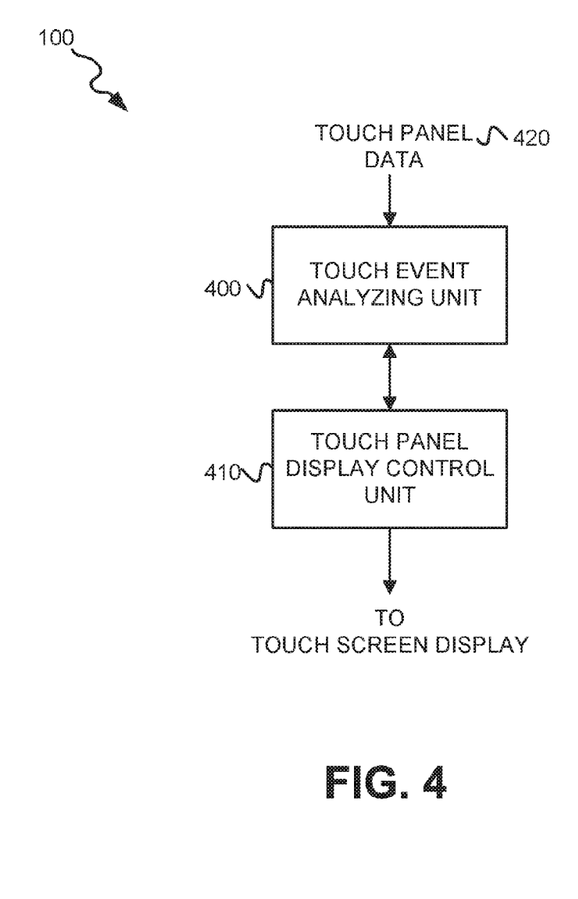
FIG. 4 is a diagram that depicts exemplary functional components of the device of FIG. 1.

FIG. 4 is a diagram that depicts exemplary functional components of device 100. The functional components of device 100 shown in FIG. 4 may be implemented by processing unit 320 in conjunction with other components of device 100 (e.g., main memory 330, communication interface(s) 380). The functional components of device 100 may include a touch event analyzing unit 400, and a touch panel display control unit 410.

Touch event analyzing unit 400 may receive touch panel data 420, corresponding to a touch event, recorded by a touch sensitive panel of the touch screen display 200 of device 100. In one embodiment, touch panel data 420 may include a two-dimensional or three-dimensional image of the touch event upon the touch sensitive panel. Unit 400 may analyze touch panel data 420 to identify the touch event as either a valid touch event or a non-valid touch event. Unit 400 may determine that a touch event is either a valid touch event or a non-valid touch event based on a location, size, two-dimensional shape, applied pressure, persistence and/or movement of the touch event upon the touch sensitive panel of the touch screen display 200 of device 100. A valid touch event may include, for example, a tap or a low speed finger drag associated with user interaction with a graphical user interface (GUI) displayed upon the display of device 100. A non-valid touch event may include any type of touch event that does not qualify as a valid touch event. In one example, a non-valid touch event may include a user's hand or hands (e.g., thumbs and/or palms) contacting outer regions of the touch sensitive panel of device 100 for a certain length of time while the user holds device 100.

Touch panel display control unit 410 may, based on a determination by unit 400 that a touch event is a non-valid touch event, determine one or more regions of the touch screen display that are associated with the touch event (i.e., the one or more regions touched by the touch event). Each of the one or more regions may be composed of one or more display locations (i.e., at an x and y position on the display). Control unit 410 may generate instructions to turn off each of the display locations of the one or more regions determined to be associated with the touch event, and may send the instructions to the touch screen display 200 of device 100. Control unit 410 may further identify an end of the touch event, and may count a threshold length of time after the end of the touch event for turning back on the one or more regions of the display of device 100 that were previously turned off. The threshold length of time may be preset, or may be variable based on user customization or based on execution of an algorithm that may adjust the length of time. Upon expiration of the threshold length of time, control unit 410 may send instructions to the touch screen display of device 100 to turn back on the one or more regions of the display.

Touch panel display control unit 410 may, based on a determination by unit 400 that a touch event is a valid touch event, determine an x, y position of the touch event, and determine a size of the touch event, on the touch screen display of device 100. Control unit 410 may determine a first region of the display that corresponds to the x, y position, and the determined size, of the touch event. Control unit 410, using a dimming curve, may determine a second region of the display surrounding the first region. The dimming curve may include a progressive, linear, s-shaped, logarithmic, or type of function for determining a second region, extending out from, and surrounding, the first region that may be dimmed in conjunction with turning off the first region of the display. Control unit 410 may further identify an end of the touch event, and may count a threshold length of time after the end of the touch event for turning back on the first region, and un-dimming the second region, of the display of device 100. The threshold length of time may be preset, or may be variable based on user customization or based on execution of an algorithm that may adjust the length of time. Upon expiration of the threshold length of time, control unit 410 may send instructions to the touch screen display of device 100 to turn back on the first region, and un-dim the second region, of the display.

The configuration of functional components of device 100 illustrated in FIG. 4 is for illustrative purposes only. It should be understood that other configurations may be implemented. Therefore, device 100 may include additional, fewer, different and/or differently configured functional components than those depicted in FIG. 4.

Exemplary Process

Figure 5A:
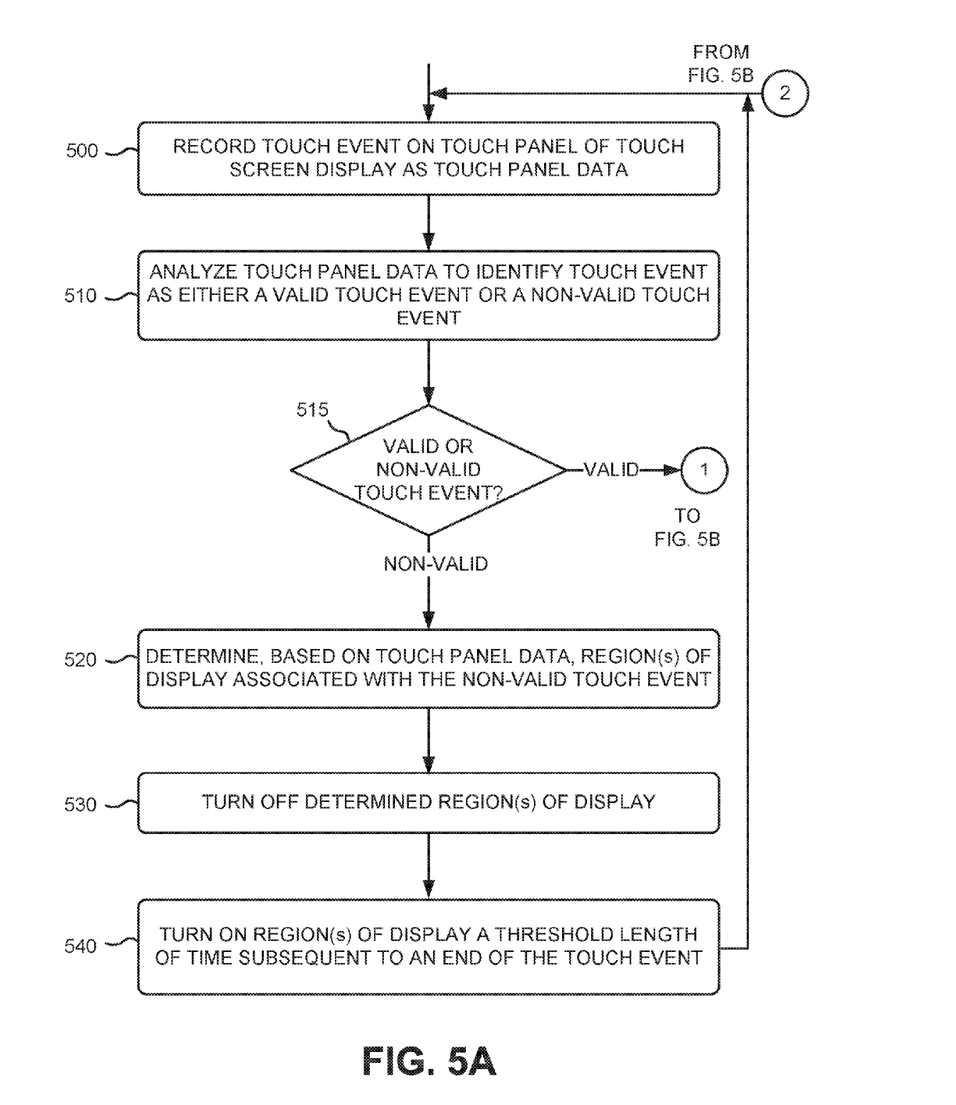
FIGS. 5A and 5B are flow diagrams illustrating an exemplary process for selectively turning off and/or dimming one or more regions of a touch screen display of a device based on a touch event upon the touch screen display.
Figure 5B:
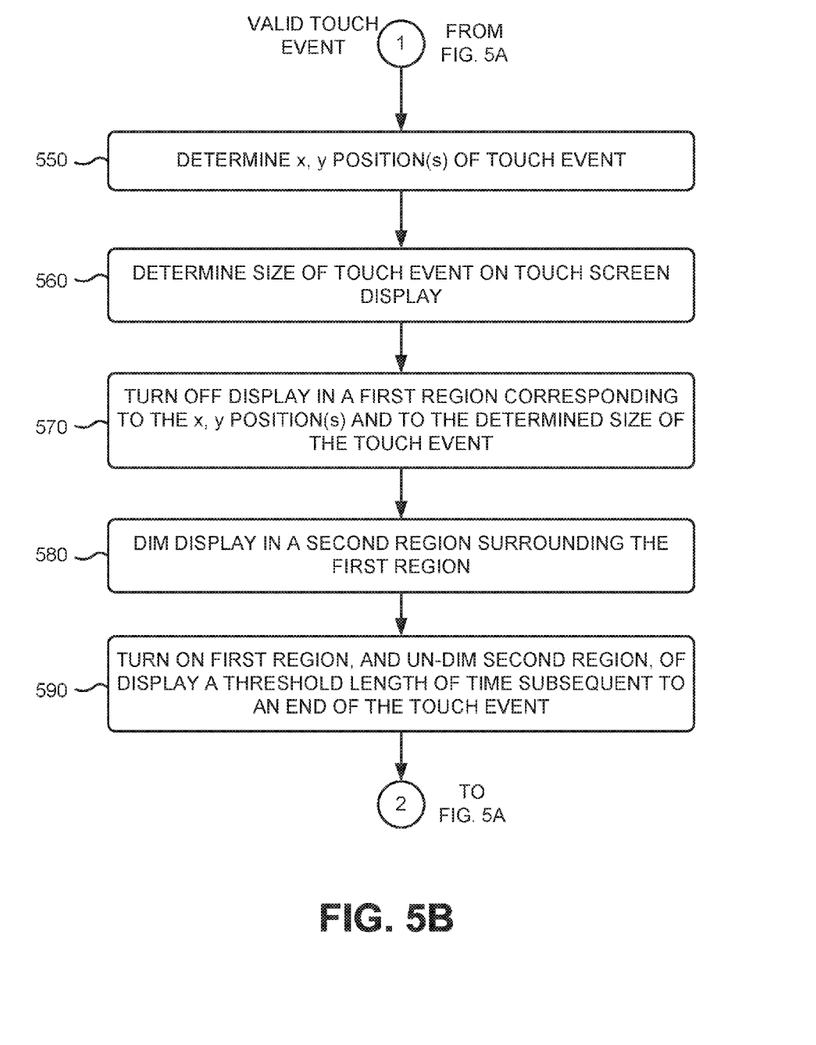

FIGS. 5A and 5B are flow diagrams illustrating an exemplary process for selectively turning off and/or dimming one or more regions of a touch screen display 200 of a device 100 based on a touch event upon the touch screen display 200. The exemplary process of FIGS. 5A and 5B may be implemented by device 100. The exemplary process of FIGS. 5A and 5B is described below with reference to FIGS. 4, 6, 7, 8A, 8B, and 9.

The exemplary process may include device 100 recording a touch event on the touch panel of the touch screen display as touch panel data (block 500). The touch panel may record the touch event as a two-dimensional or three-dimensional image in which a shape (e.g., two-dimensional shape) of the touch event upon the touch panel may be contained in the image. In one implementation, the two-dimensional image may include a two-dimensional touch "map" generated by the touch sensitive panel at the occurrence of the touch event. Touch event analyzing unit 400 of device 100 may receive the touch panel data 420 from the touch panel of the touch screen display. Device 100 may analyze the touch panel data to identify the touch event as either a valid touch event or a non-valid touch event (block 510). Touch event analyzing unit 400 may, using one or more algorithms, analyze the touch panel data received from the touch panel to determine whether the location, size, shape (e.g., two-dimensional shape), applied pressure, persistence and/or movement of the touch event upon the touch panel of the touch screen display of device 100 indicates that the touch event is either a valid or non-valid touch event (block 515). A valid touch event may include, for example, a tap, or a drag or swipe associated with normal user interaction with a user interface displayed upon the display of device 100. A non-valid touch event may include any type of touch event that does not qualify as a valid touch event, such as, for example, a user's hand or hands (e.g., thumb and/or palm) contacting outer regions of the touch sensitive panel of device 100 for an extended period of time while the user holds device 100.

Figure 6:
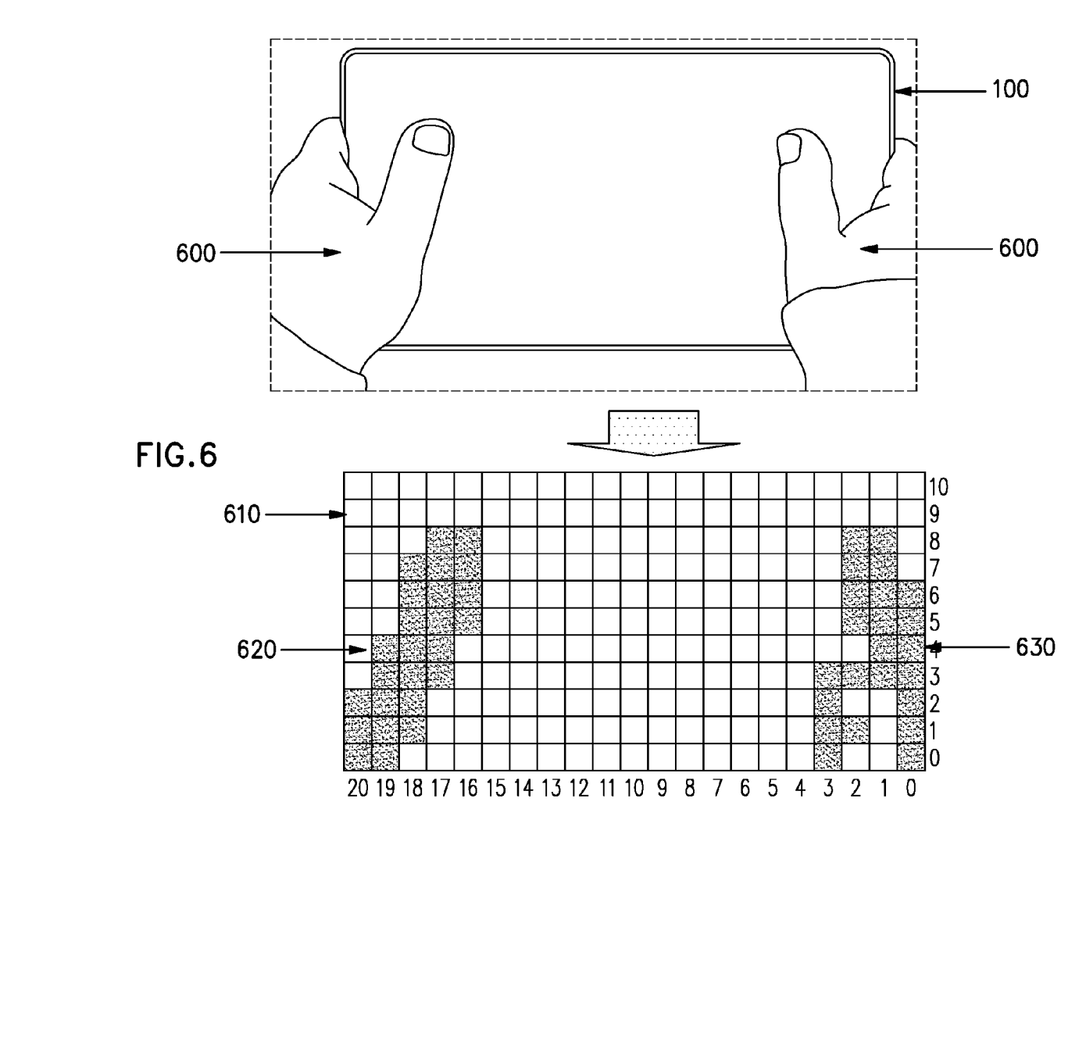
FIG. 6 is a diagram that depicts an example of a non-valid touch event upon a touch screen display of a device.

FIG. 6 depicts one example of a non-valid touch event 600 upon a touch sensitive panel of device 100. Upon analysis of a two-dimensional image 610, generated by the touch sensitive panel and corresponding to the non-valid touch event 600, two-dimensional shapes corresponding to a region 620 located adjacent a left edge of the display of device 100, and a region 630 located adjacent to a right edge of the display of device 100 are identified as corresponding to a non-valid touch event. The two-dimensional shapes corresponding to region 620 and region 630 may be identified as corresponding to the non-valid touch event based on the location, shape, lack of movement, applied pressure, and/or persistence of region 620 and region 630.

If the analysis of block 510 determines that the touch event is a non-valid touch event (NON-VALID, block 515), then device 100 may determine, based on the touch panel data, one or more regions of the display associated with the non-valid touch event (block 520). Touch panel display control unit 410 of device 100 may determine one or more regions of the display of the touch screen display that are associated with the non-valid touch event (i.e., the one or more regions of the display underlying the touch event). Each of the one or more regions may be composed of one or more display locations (i.e., at an x and y position on the display). As shown in the example of FIG. 6, control unit 410 may analyze the two-dimensional image 610 corresponding to the non-valid touch event 600 to identify the two-dimensional shapes corresponding to a region 620 located adjacent a left edge of the display of device 100, and a region 630 located adjacent to a right edge of the display of device 100 that are associated with the touch event.

Figure 7:
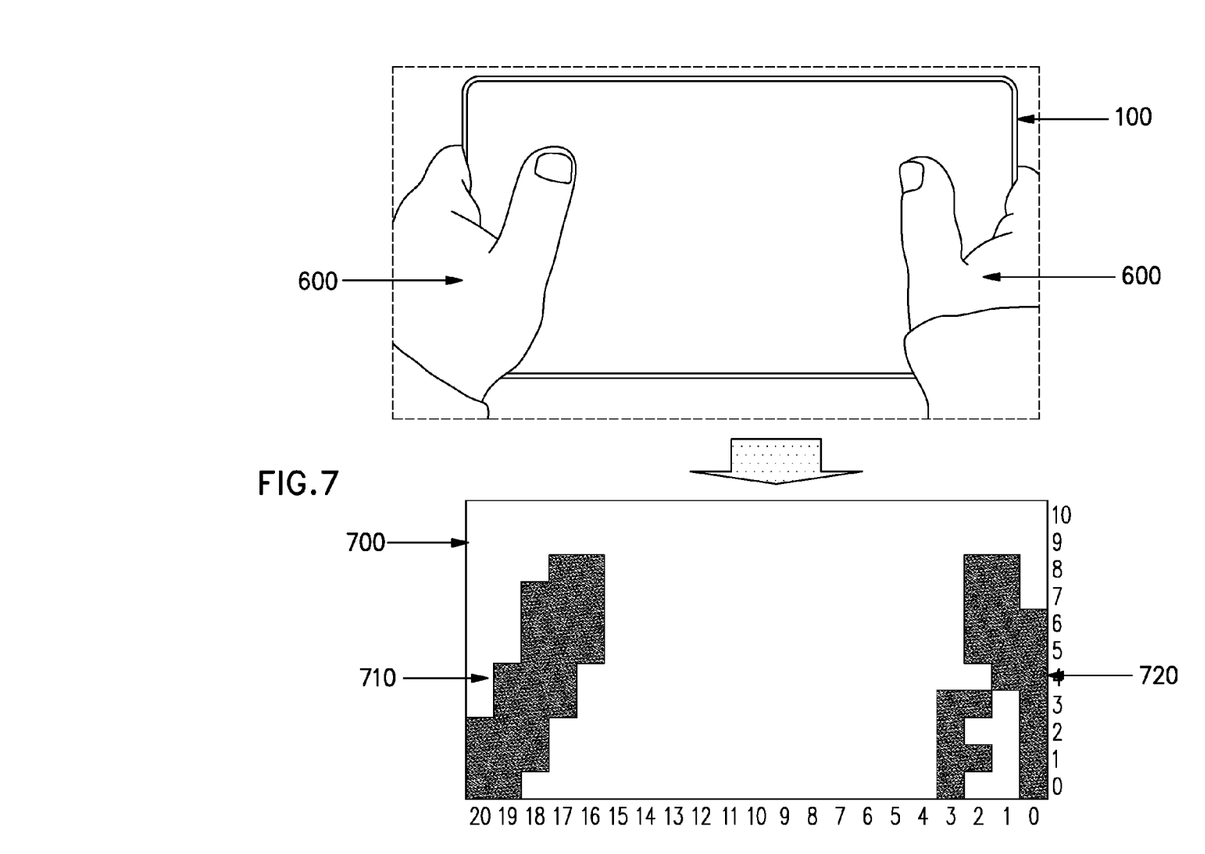
FIG. 7 is a diagram that depicts an example of turning off one or more regions, that correspond to the non-valid touch event of FIG. 6, of a display of the touch screen display of the device of FIG. 6.

Device 100 may turn off the determined one or more regions of the display of the touch screen display (block 530). Control unit 410 may generate instructions to turn off each of the display locations of the one or more regions determined to be associated with the touch event, and may send the instructions to the touch screen display of device 100. Referring again to FIG. 6, control unit 410 may generate instructions to turn off the identified the two-dimensional shapes corresponding to region 620 and region 630 that are associated with the touch event. The example of FIG. 7 depicts a display 700 of device 100 having a display region 710, which corresponds to region 620 of image 610, being turned off, and another display region 720, that corresponds to region 630 of image 610, being turned off, as indicated by the blacked out regions.

Device 100 may turn on the one or more regions of the display component a threshold length of time subsequent to an end of the touch event (block 540). Control unit 410 of device 100 may identify an end of the touch event, and may determine when a length of time after the end of the touch event exceeds a threshold time period for initiating the turning back on of the one or more regions of the display of device 100 that were previously turned off. Upon expiration of the threshold length of time, control unit 410 may send instructions to the touch screen display of device 100 to turn back on (e.g., provide power to) the one or more regions of the display. The exemplary process, subsequent to block 540, may return to block 500 with the recording of another touch event on the touch panel.

Returning to blocks 510 and 515, if the analysis of block 510 determines that the touch event is a valid touch event (VALID, block 515), the device 100 may determine an x, y position(s) of the touch event on the touch screen display of device 100 (block 550, FIG. 5B). Referring to the examples of FIGS. 8A and 8B, touch panel display control unit 410 may determine an occurrence of a touch event 810 upon touch screen display 200 of device 100, and may identify an x, y position (see FIG. 8B) of the touch event 810 that corresponds to a center point of touch event 810.

Figures 8A, 8B:
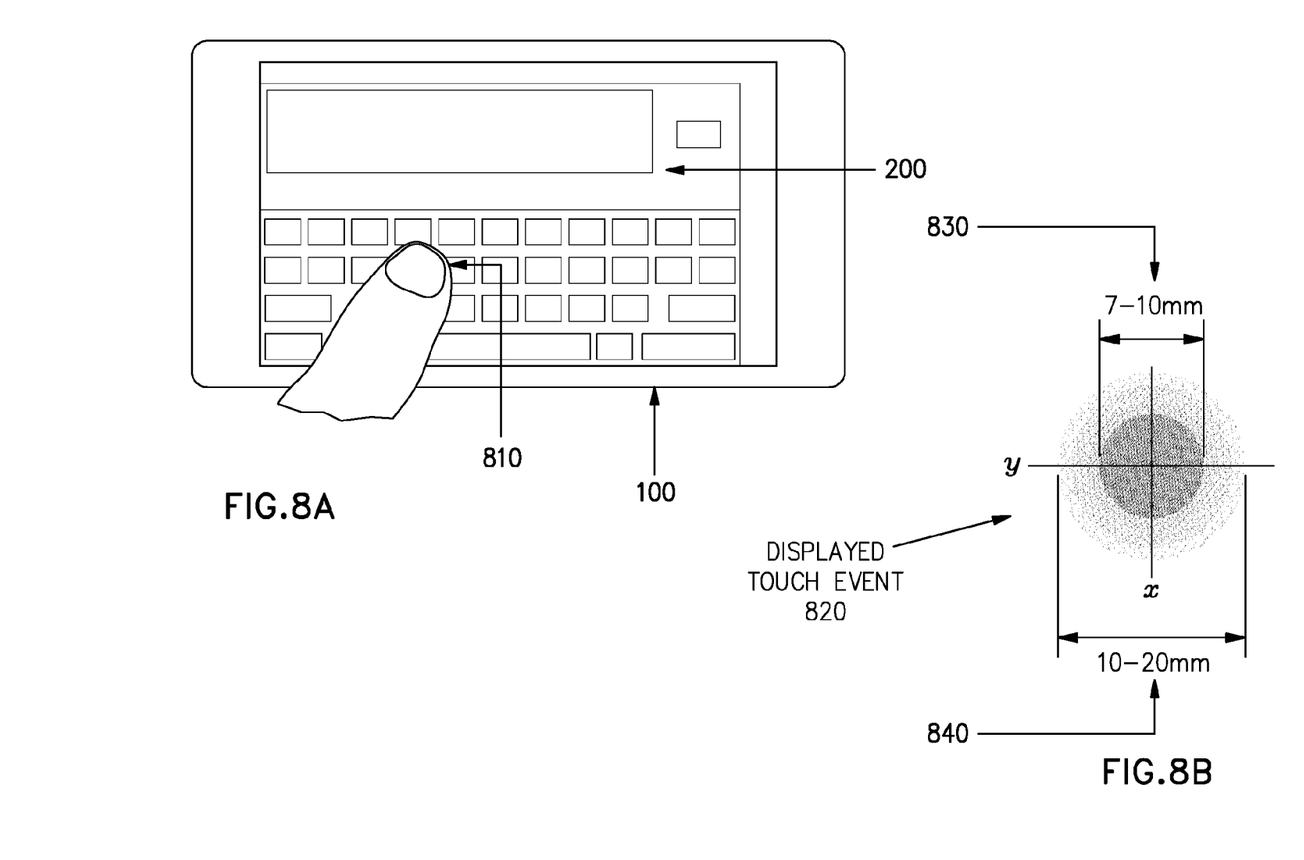
FIG. 8A is a diagram that depicts an example of a valid touch event upon a touch screen display of device.
FIG. 8B is a diagram that depicts an example of turning off a first region of a device display, corresponding to the valid touch event of FIG. 8A, and dimming a second region of the display surrounding the first region.

Device 100 may determine a size of the touch event on the touch panel display 200 (block 560). As shown in FIG. 8B, touch panel display control unit 410 may, using the touch panel data, determine a first region 830 of the display that corresponds to the x, y position, and a size, of the touch event 810. Device 100 may turn off the display in a first region corresponding to the x, y position(s), and to the determined size, of the touch event (block 570). As shown in the example of FIG. 8B, first region 830 may be determined to include a range of 7-10 mm and first region 830 may be turned off to make first region 830 completely dark on the display. Other ranges, such as less than 7 mm or greater than 10 mm may be used in other implementations.

Device 100 may dim the display in a second region surrounding the first region (block 580). Control unit 410 of device 100, using a dimming curve, may determine a second region of the display surrounding the first region. The dimming curve may include a progressive, a linear, an s-shaped, a logarithmic, or other type of function for determining a second region, extending out from, and surrounding, the first region that may be dimmed in conjunction with turning off the first region of the display. "Dimming" the display, as referred to herein, may involve reducing the supply of power (e.g., reducing a supplied voltage or voltages) to the second region of the display, surrounding the first region, at a level or levels determined by the dimming curve. Therefore, "dimming" the display may include applying a voltage(s), specified by the dimming curve, to the second region of the display.

Figure 9:
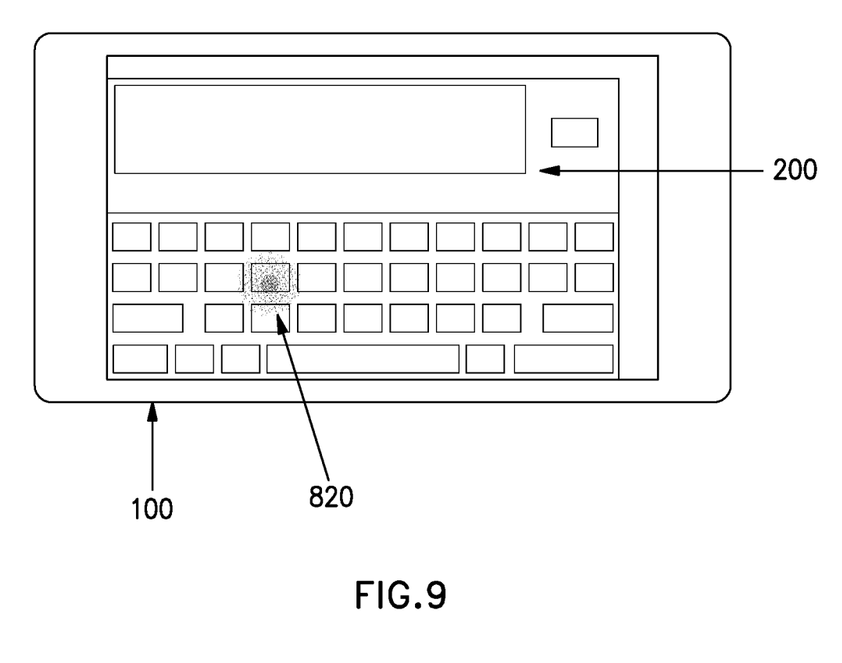
FIG. 9 is a diagram that depicts the example turned off first region and dimmed second region of FIG. 8B of the touch screen display of the device of FIG. 8A.

As shown in the example of FIG. 8B, second region 840 may be determined to include a range of 10-20 mm (i.e., 3-10 mm extending out from first region 830) and second region 840 may be dimmed based on the dimming curve used to determine second region 830. FIG. 9 depicts a further example of the displayed touch event 820 of FIG. 8B displayed upon the touch screen display 200 of device 100.

Device 100 may turn on the first region, and un-dim the second region, of the display a threshold length of time subsequent to an end of the touch event (block 590). Control unit 410 of device 100 may identify an end of the touch event, and may count a threshold length of time after the end of the touch event for turning back on the first region, and un-dimming the second region, of the display of device 100. The threshold length of time may be preset, or may be variable based on user customization or based on execution of an algorithm that may adjust the length of time. Upon expiration of the threshold length of time, control unit 410 may send instructions to the touch screen display of device 100 to turn back on the first region, and un-dim the second region, of the display. The exemplary process, subsequent to block 590, may return to block 500 with the recording of another touch event on the touch panel.

Conclusion

Implementations described herein enable the conservation of power within electronic devices having touch screen displays by turning off and/or dimming regions of the display obstructed by the finger, hand or other object used to touch the touch screen display. Since the regions turned off and/or dimmed are already obstructed by the finger(s) or hand(s), and are not visible to the user due to the obstruction, turning off and/or dimming those region(s) does not negatively impact the user's use of the touch screen display.

The foregoing description of the embodiments described herein provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5A and 5B, the order of the blocks may be varied in other implementations. Moreover, non-dependent blocks may be performed in parallel. Embodiments have been described herein as turning off a first region of a display, and possibly dimming another region surrounding that first region. In other implementations, one or more regions of the display may only be dimmed, using a dimming curve, instead of turning off the one or more regions. For example, referring to FIG. 7, display regions 710 and 720 may be dimmed, using a dimming curve, instead of being turned off.

Certain features described herein may be implemented as "logic" or as a "unit" that performs one or more functions. This logic or unit may include hardware, such as one or more processors, microprocessors, application specific integrated circuits, or field programmable gate arrays, software, or a combination of hardware and software.

The term "comprises" or "comprising" as used herein, including the claims, specifies the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Further, the phrase "based on," as used herein is intended to mean "based, at least in part, on" unless explicitly stated otherwise.

What is claimed is:

1. A method, comprising:
receiving a touch event upon a device's touch screen display, wherein the touch screen display comprises a touch sensitive panel and a display;
recording the touch event as touch panel data;
analyzing the touch panel data to identify the touch event as a valid or a non-valid touch event;
determining, if the touch event is a non-valid touch event and based on the touch panel data, a first region of the display associated with the non-valid touch event;
turning off the first region of the display;
turning on the first region, of the display a threshold length of time subsequent to an end of the touch event, wherein the threshold length of time comprises a variable length of time that is customized by a user of the device, or is set based on execution of an algorithm that adjusts the variable length of time;
determining a second region of the display, associated with the non-valid touch event, surrounding the first region; and
dimming, using a dimming curve, the second region surrounding the first region.

2. The method of claim 1, wherein analyzing the touch panel data comprises:
analyzing the touch panel data to determine a persistence associated with the touch event upon the touch sensitive panel.

3. The method of claim 1, wherein the touch panel data comprises a two-dimensional or three-dimensional image of the touch event upon the touch sensitive panel and wherein analyzing the touch panel data comprises:
analyzing a shape of the two-dimensional or three-dimensional image of the touch event;
determining a persistence associated with the shape of the two-dimensional or three-dimensional image of the touch event; and
determining if the persistence associated with the shape of the two-dimensional or three-dimensional image of the touch event is greater than a threshold period of time.

4. The method of claim 1, wherein analyzing the touch panel data to identify the touch event as a valid touch event comprises:
analyzing the touch panel data to identify a shape and movement of the touch event on the touch panel.

5. The method of claim 1, wherein in response to identifying that the touch event is a valid touch event:
determining a position of the touch event on the touch sensitive panel and the display;
estimating a size of the touch event on the touch sensitive panel and the display;
turning off the display in a third region corresponding to the position of the touch event; and
dimming the display in a fourth region surrounding the third region.

6. The method of claim 5, further comprising:
turning on the third region of the display a threshold length of time subsequent to an end of the touch event.

7. The method of claim 5, further comprising:
un-dimming the display in the fourth region the threshold length of time subsequent to an end of the touch event.

8. A device, comprising:
a touch screen display comprising a touch sensitive panel and a display and configured to:
receive a touch event upon the touch sensitive panel, and
record the touch event as touch panel data; and
a processing unit configured to:
analyze the touch panel data to identify the touch event as a valid or a non-valid touch event,
determine, if the touch event is a non-valid touch event and based on the touch panel data, one or more regions of the display associated with the non-valid touch event, and
turn off or dim the determined one or more regions of the display,
wherein in response to determining that the touch event is a valid touch event, the processing unit is further configured to:
determine a position of the touch event on the touch sensitive panel and the display,
estimate a size of the touch event on the touch sensitive panel and the display,
turn off the display in a first region corresponding to the position of the touch event, and
dim the display in a second region surrounding the first region; and
wherein, when dimming the display in the second region surrounding the first region, the processing unit is further configured to:
use a dimming curve to determine the second region surrounding the first region, wherein the dimming curve comprises a function that determines the second region, extending out from and surrounding the first region.

9. The device of claim 8, wherein the processing unit is further configured to:
turn on the one or more regions of the display a threshold length of time subsequent to an end of the touch event.

10. The device of claim 8, wherein, when analyzing the touch panel data, the processing unit is configured to:
analyze a two-dimensional shape of the touch event based on the touch panel data, or
analyze the touch panel data to identify a shape and movement of the touch event on the touch sensitive panel.

11. The device of claim 10, wherein, when determining if the touch event is a non-valid touch event, the processing unit is configured to:
determine if a persistence associated with the two-dimensional shape of the touch event, based on the touch panel data, is greater than a threshold period of time.

12. The device of claim 8, wherein the processing unit is further configured to:
turn on the first region of the display, and un-dim the display in the second region, a threshold length of time subsequent to an end of the touch event.

13. The device of claim 8, wherein the function comprises a progressive, a linear, an s-shaped, or a logarithmic function.

14. The device of claim 8, wherein, when dimming the display in the second region surrounding the first region, the processing unit is configured to:
cause a reduction in the supply of power to the second region of the display.

15. A non-transitory computer-readable medium containing instructions executable by at least one processing unit, comprising:
one or more instructions for recording a touch event upon a device's touch screen display as touch panel data, wherein the touch screen display comprises a touch sensitive panel and a display;
one or more instructions for analyzing the touch panel data;

one or more instructions for determining, based on the analysis of the touch panel data, a first region of the display associated with the touch event;

one or more instructions for turning off the determined first region of the display;

one or more instructions for determining a second region of the display, associated with the touch event, surrounding the first region; and one or more instructions for dimming, using a dimming curve, the second region surrounding the first region.

16. The non-transitory computer-readable medium of claim 15, wherein the one or more instructions for determining the first region of the display further comprises:

one or more instructions for determining a position of the touch event on the touch sensitive panel and the display;

one or more instructions for estimating a size of the touch event on the touch sensitive panel and the display;

one or more instructions for turning off the display in the first region corresponding to the position of the touch event.

17. The non-transitory computer-readable medium of claim 15, wherein the dimming curve comprises a function that determines the second region, extending out from and surrounding the first region of the display.

18. The non-transitory computer-readable medium of claim 17, wherein the function comprises a progressive, a linear, an s-shaped, or a logarithmic function.

19. The non-transitory computer-readable medium of claim 15, wherein the one or more instructions for dimming the second region surrounding the first region comprise:

one or more instructions for causing a reduction in supply of power to the second region surrounding the first region.

* * * * *